(12) United States Patent
Mao et al.

(10) Patent No.: US 12,452,436 B2
(45) Date of Patent: *Oct. 21, 2025

(54) SCENE CLASSIFICATION AND LEARNING FOR VIDEO COMPRESSION

(71) Applicant: Comcast Cable Communications, LLC, Philadelphia, PA (US)

(72) Inventors: Weidong Mao, West Windsor, NJ (US); Alexander Giladi, Princeton, NJ (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/631,862

(22) Filed: Apr. 10, 2024

(65) Prior Publication Data
US 2025/0080758 A1    Mar. 6, 2025

Related U.S. Application Data

(63) Continuation of application No. 17/586,453, filed on Jan. 27, 2022, now Pat. No. 11,985,337, which is a (Continued)

(51) Int. Cl.
*H04N 19/176* (2014.01)
*G06V 20/40* (2022.01)
(Continued)

(52) U.S. Cl.
CPC .......... *H04N 19/176* (2014.11); *G06V 20/49* (2022.01); *H04N 19/166* (2014.11);
(Continued)

(58) Field of Classification Search
CPC ........ H04N 19/17; H04N 19/46; H04N 19/61; H04N 19/115; H04N 19/117;
(Continued)

(56) References Cited

U.S. PATENT DOCUMENTS 5,978,031 A    11/1999  Kim
5,990,957 A *  11/1999  Ryoo ................... H04N 19/61
                                             375/E7.157

(Continued)

OTHER PUBLICATIONS

Jun. 17, 2020—European Partial Search Report—EP 20160932.8.
(Continued)

*Primary Examiner* — Christopher S Kelley
*Assistant Examiner* — Asmamaw G Tarko
(74) *Attorney, Agent, or Firm* — Banner & Witcoff, Ltd.

(57) ABSTRACT

Systems, apparatuses, and methods are described for encoding a scene of media content based on visual elements of the scene. A scene of media content may comprise one or more visual elements, such as individual objects in the scene. Each visual element may be classified based on, for example, the motion and/or identity of the visual element. Based on the visual element classifications, scene encoder parameters and/or visual element encoder parameters for different visual elements may be determined. The scene may be encoded using the scene encoder parameters and/or the visual element encoder parameters.

17 Claims, 6 Drawing Sheets

Related U.S. Application Data continuation of application No. 16/291,076, filed on Mar. 4, 2019, now Pat. No. 11,272,192.

(51) Int. Cl.

| | | |
|---|---|---|
| *H04N 19/115* | (2014.01) | |
| *H04N 19/117* | (2014.01) | |
| *H04N 19/154* | (2014.01) | |
| *H04N 19/162* | (2014.01) | |
| *H04N 19/166* | (2014.01) | |
| *H04N 19/17* | (2014.01) | |
| *H04N 19/177* | (2014.01) | |
| *H04N 19/179* | (2014.01) | |
| *H04N 19/192* | (2014.01) | |
| *H04N 19/196* | (2014.01) | |
| *H04N 19/46* | (2014.01) | |
| *H04N 19/517* | (2014.01) | |
| *H04N 19/61* | (2014.01) | |
| *H04N 21/647* | (2011.01) | |

(52) U.S. Cl.
CPC ..... *H04N 19/517* (2014.11); *H04N 21/64738* (2013.01); *H04N 19/115* (2014.11); *H04N 19/117* (2014.11); *H04N 19/154* (2014.11); *H04N 19/162* (2014.11); *H04N 19/17* (2014.11); *H04N 19/177* (2014.11); *H04N 19/179* (2014.11); *H04N 19/192* (2014.11); *H04N 19/196* (2014.11); *H04N 19/46* (2014.11); *H04N 19/61* (2014.11)

(58) Field of Classification Search
CPC .. H04N 19/154; H04N 19/162; H04N 19/166; H04N 19/176; H04N 19/177; H04N 19/179; H04N 19/192; H04N 19/196; H04N 19/517; H04N 21/64738; G06V 20/49
USPC ..................................... 375/240.12
See application file for complete search history.

(56) References Cited

U.S. PATENT DOCUMENTS

| | | | | |
|---|---|---|---|---|
| 6,167,087 A * | 12/2000 | Kato | ............... | H04N 19/176 |
| | | | | 375/E7.157 |
| 6,249,613 B1 * | 6/2001 | Crinon | ............... | H04N 19/23 |
| | | | | 375/E7.106 |
| 8,369,397 B2 * | 2/2013 | Bordes | ............... | H04N 21/8451 |
| | | | | 375/240 |
| 8,908,984 B2 | 12/2014 | Carmel et al. | | |
| 9,392,304 B2 * | 7/2016 | Coudurier | ............ | H04N 19/154 |
| 9,762,931 B2 * | 9/2017 | Jia | ........................ | H04N 19/156 |
| 10,264,255 B2 * | 4/2019 | Naletov | ............... | H04N 19/177 |
| 10,375,156 B2 | 8/2019 | Coward et al. | | |
| 10,728,568 B1 * | 7/2020 | Waggoner | ............... | H04N 19/46 |
| 11,272,192 B2 | 3/2022 | Mao et al. | | |
| 2001/0017887 A1 * | 8/2001 | Furukawa | ............... | H04N 19/139 |
| | | | | 375/E7.211 |
| 2005/0132420 A1 * | 6/2005 | Howard | .................. | G06F 3/017 |
| | | | | 348/E5.103 |
| 2006/0238444 A1 * | 10/2006 | Wang | ................... | H04N 19/115 |
| | | | | 375/E7.172 |
| 2009/0074058 A1 | 3/2009 | Zhang et al. | | |
| 2009/0096927 A1 * | 4/2009 | Camp, Jr. | ............ | H04N 19/176 |
| | | | | 348/613 |
| 2011/0103473 A1 | 5/2011 | Li et al. | | |
| 2012/0147958 A1 * | 6/2012 | Ronca | .................... | H04N 19/14 |
| | | | | 375/240.24 |
| 2012/0148208 A1 * | 6/2012 | Hozumi | ................. | H04N 5/772 |
| | | | | 386/E5.028 |
| 2013/0202201 A1 * | 8/2013 | Park | ....................... | H04N 19/60 |
| | | | | 382/233 |
| 2016/0286252 A1 | 9/2016 | Coudurier et al. | | |
| 2016/0381318 A1 * | 12/2016 | Yang | ....................... | H04N 7/152 |
| | | | | 348/14.06 |
| 2017/0078376 A1 * | 3/2017 | Coward | ............... | H04N 19/395 |
| 2017/0302965 A1 | 10/2017 | Xu et al. | | |
| 2017/0359580 A1 * | 12/2017 | Su | ........................ | H04N 19/179 |
| 2019/0014332 A1 | 1/2019 | Song et al. | | |
| 2019/0045194 A1 * | 2/2019 | Zavesky | ............... | H04N 19/179 |
| 2019/0156535 A1 * | 5/2019 | DeLuca | .................. | G06F 3/013 |
| 2019/0182451 A1 * | 6/2019 | Arana | ............. | H04N 21/23418 |
| 2020/0288149 A1 | 9/2020 | Mao et al. | | |
| 2021/0067818 A1 * | 3/2021 | Sen | .................... | H04N 21/8456 |
| 2022/0070479 A1 | 3/2022 | Reznik et al. | | |

OTHER PUBLICATIONS

ISO-IEC/JTC1/SC29/WG11; Dublin, Jul. 1998; Source: Paulo Nunes, Fernando Pereira; Title: Rate Control in Object-based Video Coding Frameworks.

XP000634361; Oct. 1996; Source: Optical Engineering, vol. 35 No. 10; Title: Adaptive image sequence coding based on global and local compensability analysis.

Miao, Dan; May 2016; Source: ACM Trans. Multimedia Comput. Commun. Appl., vol. 12, No. 3, Article 44; Title: A High-Fidelity and Low-Interaction-Delay Screen Sharing System.

Moon et al. "Effective Shape Adaptive Region Partitioning (SARP) Methods by Varying Block Grid Positions", 32. MPEG Meeting; Nov. 3, 1995, Dallas, XP030030076.

Oct. 30, 2020, Extended European Search Report, EP 20160932.8.

Mar. 21, 2023—European Office Action—EP App. No. 20160932.8.

\* cited by examiner

SCENE CLASSIFICATION AND LEARNING FOR VIDEO COMPRESSION

CROSS-REFERENCE TO RELATED APPLICATIONS

This application is a continuation of and claims priority to U.S. patent application Ser. No. 17/586,453 filed on Jan. 27, 2022, which is a continuation of U.S. patent application Ser. No. 16/291,076, filed Mar. 4, 2019 (now U.S. Pat. No. 11,272,192), each of which is hereby incorporated by reference in its entirety.

BACKGROUND

Video encoding and/or compression techniques may use different parameters and/or approaches to handling video, and may achieve different quality results for different situations and different types of video. Effective choice of the techniques and/or parameters may provide for efficient use of delivery resources while maintaining user satisfaction.

SUMMARY

The following summary presents a simplified summary of certain features. The summary is not an extensive overview and is not intended to identify key or critical elements.

Systems, apparatuses, and methods are described for scene classification and encoding. A variety of different encoding parameters may be used to encode different portions of a video content item in different ways. Video content may be processed to identify different scenes, and within each scene, visual elements of different regions of the video image may be classified based on their visual characteristics. Different encoding parameters may be selected for the different regions based on the classification, and the video content item may be encoded accordingly. The resulting encoded video may be processed to identify artifacts, and may be re-encoded with modified parameters to remove the artifacts.

These and other features and advantages are described in greater detail below.

BRIEF DESCRIPTION OF THE DRAWINGS

Some features are shown by way of example, and not by limitation, in the accompanying drawings. In the drawings, like numerals reference similar elements.

DETAILED DESCRIPTION

Figure 1:
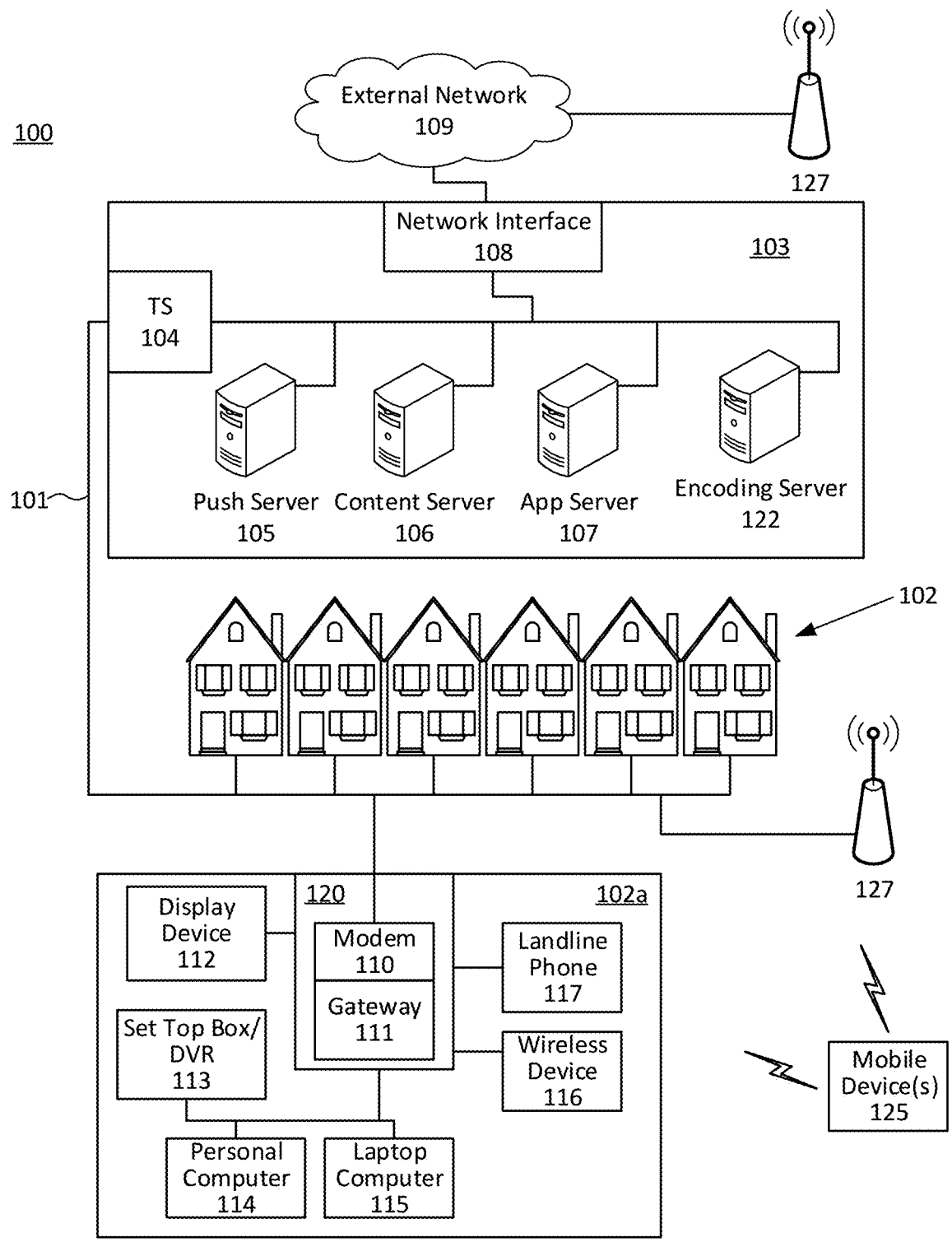
FIG. 1 shows an example communication network.

The accompanying drawings, which form a part hereof, show examples of the disclosure. It is to be understood that the examples shown in the drawings and/or discussed herein are non-exclusive and that there are other examples of how the disclosure may be practiced.

FIG. 1 shows an example communication network 100 in which features described herein may be implemented. The communication network 100 may comprise one or more information distribution networks of any type, such as, without limitation, a telephone network, a wireless network (e.g., an LTE network, a 5G network, a WiFi IEEE 802.11 network, a WiMAX network, a satellite network, and/or any other network for wireless communication), an optical fiber network, a coaxial cable network, and/or a hybrid fiber/coax distribution network. The communication network 100 may use a series of interconnected communication links 101 (e.g., coaxial cables, optical fibers, wireless links, etc.) to connect multiple premises 102 (e.g., businesses, homes, consumer dwellings, train stations, airports, etc.) to a local office 103 (e.g., a headend). The local office 103 may send downstream information signals and receive upstream information signals via the communication links 101. Each of the premises 102 may comprise devices, described below, to receive, send, and/or otherwise process those signals and information contained therein.

The communication links 101 may originate from the local office 103 and may comprise components not illustrated, such as splitters, filters, amplifiers, etc., to help convey signals clearly. The communication links 101 may be coupled to one or more wireless access points 127 configured to communicate with one or more mobile devices 125 via one or more wireless networks. The mobile devices 125 may comprise smart phones, tablets or laptop computers with wireless transceivers, tablets or laptop computers communicatively coupled to other devices with wireless transceivers, and/or any other type of device configured to communicate via a wireless network.

The local office 103 may comprise an interface 104, such as a termination system (TS). The interface 104 may comprise a cable modem termination system (CMTS) and/or other computing device(s) configured to send information downstream to, and to receive information upstream from, devices communicating with the local office 103 via the communications links 101. The interface 104 may be configured manage communications among those devices, to manage communications between those devices and backend devices such as servers 105-107 and 122, and/or to manage communications between those devices and one or more external networks 109. The local office 103 may comprise one or more network interfaces 108 that comprise circuitry needed to communicate via the external networks 109. The external networks 109 may comprise networks of Internet devices, telephone networks, wireless networks, wireless networks, fiber optic networks, and/or any other desired network. The local office 103 may also or alternatively communicate with the mobile devices 125 via the interface 108 and one or more of the external networks 109, e.g., via one or more of the wireless access points 127.

The push notification server 105 may be configured to generate push notifications to deliver information to devices in the premises 102 and/or to the mobile devices 125. The content server 106 may be configured to provide content to devices in the premises 102 and/or to the mobile devices 125. This content may comprise, for example, video, audio, text, web pages, images, files, etc. The content server 106 (or, alternatively, an authentication server) may comprise software to validate user identities and entitlements, to locate and retrieve requested content, and/or to initiate delivery (e.g., streaming) of the content. The application server 107 may be configured to offer any desired service.

For example, an application server may be responsible for collecting, and generating a download of, information for electronic program guide listings. Another application server may be responsible for monitoring user viewing habits and collecting information from that monitoring for use in selecting advertisements. Yet another application server may be responsible for formatting and inserting advertisements in a video stream being transmitted to devices in the premises 102 and/or to the mobile devices 125. The local office 103 may comprise additional servers, such as the encoding server 122 (described below), additional push, content, and/or application servers, and/or other types of servers. Although shown separately, the push server 105, the content server 106, the application server 107, the encoding server 122, and/or other server(s) may be combined. The servers 105, 106, 107, and 122, and/or other servers, may be computing devices and may comprise memory storing data and also storing computer executable instructions that, when executed by one or more processors, cause the server(s) to perform steps described herein.

An example premises 102a may comprise an interface 120. The interface 120 may comprise circuitry used to communicate via the communication links 101. The interface 120 may comprise a modem 110, which may comprise transmitters and receivers used to communicate via the communication links 101 with the local office 103. The modem 110 may comprise, for example, a coaxial cable modem (for coaxial cable lines of the communication links 101), a fiber interface node (for fiber optic lines of the communication links 101), twisted-pair telephone modem, a wireless transceiver, and/or any other desired modem device. One modem is shown in FIG. 1, but a plurality of modems operating in parallel may be implemented within the interface 120. The interface 120 may comprise a gateway 111. The modem 110 may be connected to, or be a part of, the gateway 111. The gateway 111 may be a computing device that communicates with the modem(s) 110 to allow one or more other devices in the premises 102a to communicate with the local office 103 and/or with other devices beyond the local office 103 (e.g., via the local office 103 and the external network(s) 109). The gateway 111 may comprise a set-top box (STB), digital video recorder (DVR), a digital transport adapter (DTA), a computer server, and/or any other desired computing device.

The gateway 111 may also comprise one or more local network interfaces to communicate, via one or more local networks, with devices in the premises 102a. Such devices may comprise, e.g., display devices 112 (e.g., televisions), STBs or DVRs 113, personal computers 114, laptop computers 115, wireless devices 116 (e.g., wireless routers, wireless laptops, notebooks, tablets and netbooks, cordless phones (e.g., Digital Enhanced Cordless Telephone-DECT phones), mobile phones, mobile televisions, personal digital assistants (PDA)), landline phones 117 (e.g. Voice over Internet Protocol-VoIP phones), and any other desired devices. Example types of local networks comprise Multimedia Over Coax Alliance (MoCA) networks, Ethernet networks, networks communicating via Universal Serial Bus (USB) interfaces, wireless networks (e.g., IEEE 802.11, IEEE 802.15, Bluetooth), networks communicating via in-premises power lines, and others. The lines connecting the interface 120 with the other devices in the premises 102a may represent wired or wireless connections, as may be appropriate for the type of local network used. One or more of the devices at the premises 102a may be configured to provide wireless communications channels (e.g., IEEE 802.11 channels) to communicate with one or more of the mobile devices 125, which may be on- or off-premises.

The mobile devices 125, one or more of the devices in the premises 102a, and/or other devices may receive, store, output, and/or otherwise use assets. An asset may comprise a video, a game, one or more images, software, audio, text, webpage(s), and/or other content.

Figure 2:
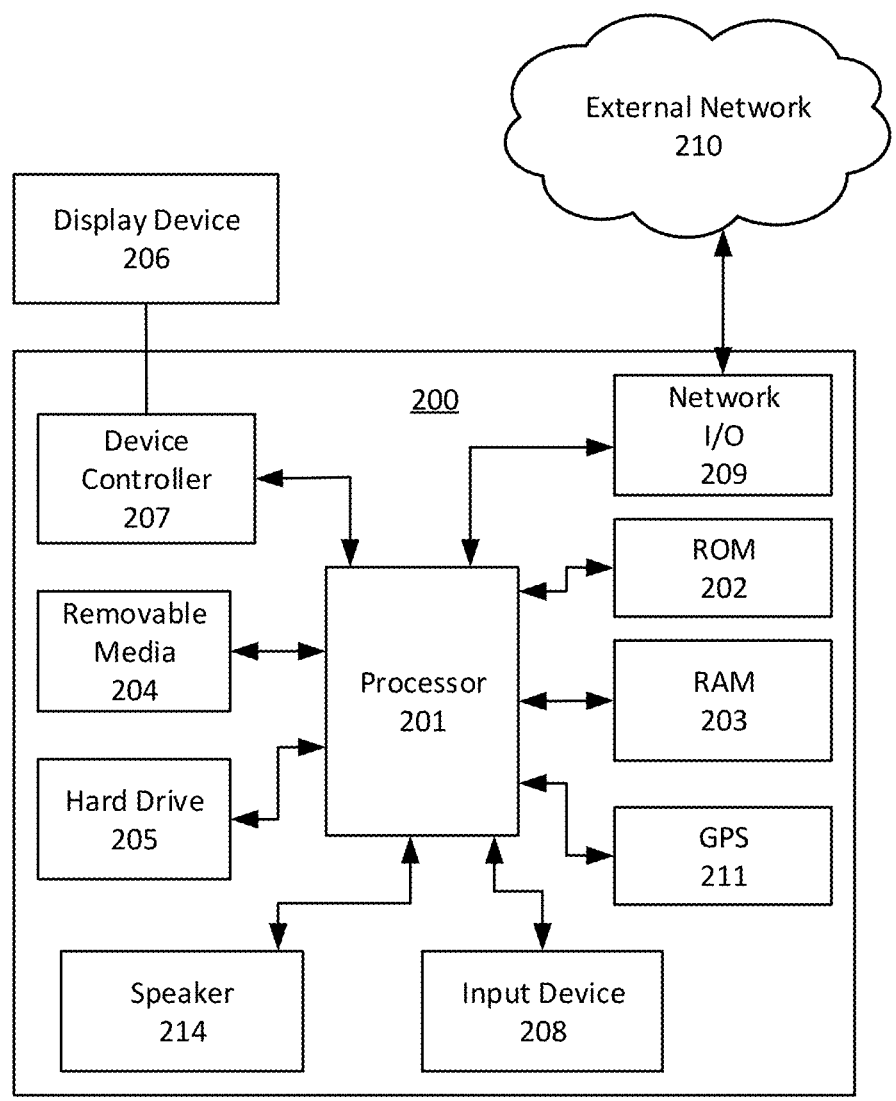
FIG. 2 shows hardware elements of a computing device.

FIG. 2 shows hardware elements of a computing device 200 that may be used to implement any of the computing devices shown in FIG. 1 (e.g., the mobile devices 125, any of the devices shown in the premises 102a, any of the devices shown in the local office 103, any of the wireless access points 127, any devices with the external network 109) and any other computing devices discussed herein (e.g., encoding devices). The computing device 200 may comprise one or more processors 201, which may execute instructions of a computer program to perform any of the functions described herein. The instructions may be stored in a read-only memory (ROM) 202, random access memory (RAM) 203, removable media 204 (e.g., a USB drive, a compact disk (CD), a digital versatile disk (DVD)), and/or in any other type of computer-readable medium or memory. Instructions may also be stored in an attached (or internal) hard drive 205 or other types of storage media. The computing device 200 may comprise one or more output devices, such as a display device 206 (e.g., an external television and/or other external or internal display device) and a speaker 214, and may comprise one or more output device controllers 207, such as a video processor. One or more user input devices 208 may comprise a remote control, a keyboard, a mouse, a touch screen (which may be integrated with the display device 206), microphone, etc. The computing device 200 may also comprise one or more network interfaces, such as a network input/output (I/O) interface 210 (e.g., a network card) to communicate with an external network 209. The network I/O interface 210 may be a wired interface (e.g., electrical, RF (via coax), optical (via fiber)), a wireless interface, or a combination of the two. The network I/O interface 210 may comprise a modem configured to communicate via the external network 209. The external network 209 may comprise the communication links 101 discussed above, the external network 109, an in-home network, a network provider's wireless, coaxial, fiber, or hybrid fiber/coaxial distribution system (e.g., a DOCSIS network), or any other desired network. The communication device 200 may comprise a location-detecting device, such as a global positioning system (GPS) microprocessor 211, which may be configured to receive and process global positioning signals and determine, with possible assistance from an external server and antenna, a geographic position of the communication device 200.

Although FIG. 2 shows an example hardware configuration, one or more of the elements of the computing device 200 may be implemented as software or a combination of hardware and software. Modifications may be made to add, remove, combine, divide, etc. components of the computing device 200. Additionally, the elements shown in FIG. 2 may be implemented using basic computing devices and components that have been configured to perform operations such as are described herein. For example, a memory of the computing device 200 may store computer-executable instructions that, when executed by the processor 201 and/or one or more other processors of the computing device 200, cause the computing device 200 to perform one, some, or all of the operations described herein. Such memory and processor(s) may also or alternatively be implemented through one or more Integrated Circuits (ICs). An IC may be, for example, a microprocessor that accesses programming instructions or other data stored in a ROM and/or hardwired into the IC. For example, an IC may comprise an Application Specific Integrated Circuit (ASIC) having gates and/or other logic dedicated to the calculations and other operations described herein. An IC may perform some operations based on execution of programming instructions read from ROM or RAM, with other operations hardwired into gates or other logic. Further, an IC may be configured to output image data to a display buffer.

Figure 3A:
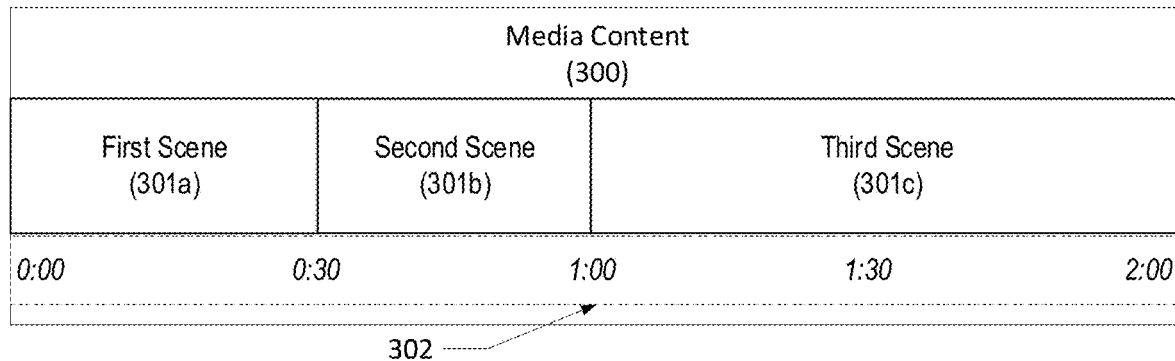
FIG. 3a shows a representation of media content.

FIG. 3a shows a representation of a timeline of scenes of media content 300. The example media content 300 comprises three scenes: first scene 301a, second scene 301b, and third scene 301c. A timeline 302 is shown on the horizontal axis, such that the first scene 301a is shown to be thirty seconds long, the second scene 301b is shown to be thirty seconds long, and the third scene 301c is shown to be one minute long. As such, the media content 300 shown in FIG. 3a is two minutes long. The media content 300 may, for example, be stored on the content server 106 and may be encoded by the encoding server 122. The media content 300 may be configured for display on devices such as, for example, the display device 112, the display device 206, the personal computer 114, the mobile devices 125, or other similar computing devices and/or display devices.

The media content 300 may be any video and/or audio content. For example, the media content 300 may be a television show (e.g., a nightly newscast), a movie, an advertisement, or a recorded event (e.g., a sports game) broadcast to a computing device communicatively coupled to a television, such as the digital video recorder 113. The media content 300 may be streaming (e.g., a live video broadcast) and/or may be on-demand. The media content 300 may be video and/or audio content (e.g., stored on the content server 106 for display on a website or via the digital video recorder 113). The media content 300 may be divided into one or more scenes, such as the first scene 301a, the second scene 301b, and the third scene 301c. Scenes may each comprise one or more frames of video and/or audio. Scenes may each comprise any portion of the media content 300 over a period of time. For example, the media content 300 may comprise a news broadcast, such that the first scene 301a may be a portion of the media content 300 with a first news caster in a studio, the second scene 301b may be a portion of the media content 300 from a traffic helicopter, and the third scene 301c may be a portion of the media content 300 showing a political speech. The media content 300 may be a movie, and a scene may be a two-minute portion of a movie. Each scene may have a variety of visual elements. For example, a scene of a news report may comprise one or more newscasters, a logo, and a stock ticker.

Scenes, such as the first scene 301a, the second scene 301b, and the third scene 301c, may comprise similar or different visual elements. For example, the media content 300 may be a news report, and the first scene 301a may relate to a first news story, whereas the second scene 301b may relate to a second news story. In such an example, some visual elements (e.g., the news caster, the background, the news ticker) may be the same or substantially the same, whereas other visual elements (e.g., the title text, an image in a picture-in-picture display) may be different. Scenes may correspond to the editing decisions of a content creator (e.g., the editing decisions of the editor of a movie).

A boundary may exist between two sequential scenes in media content 300. Information indicating a boundary between scenes (e.g., the frame number, timecode, or other identifier of the first and/or last frame or frames of one or more scenes) may be stored in metadata or otherwise made available to one or more computing devices. For example, some video editing tools insert metadata into produced video files, and such metadata may include timecodes corresponding to the boundary between different scenes. A content provider may transmit, along with media content and/or through out-of-band communications, information about the boundary between scenes. For example, the content provider may transmit a list of frames that correspond to the beginnings of scenes.

Figure 3B:
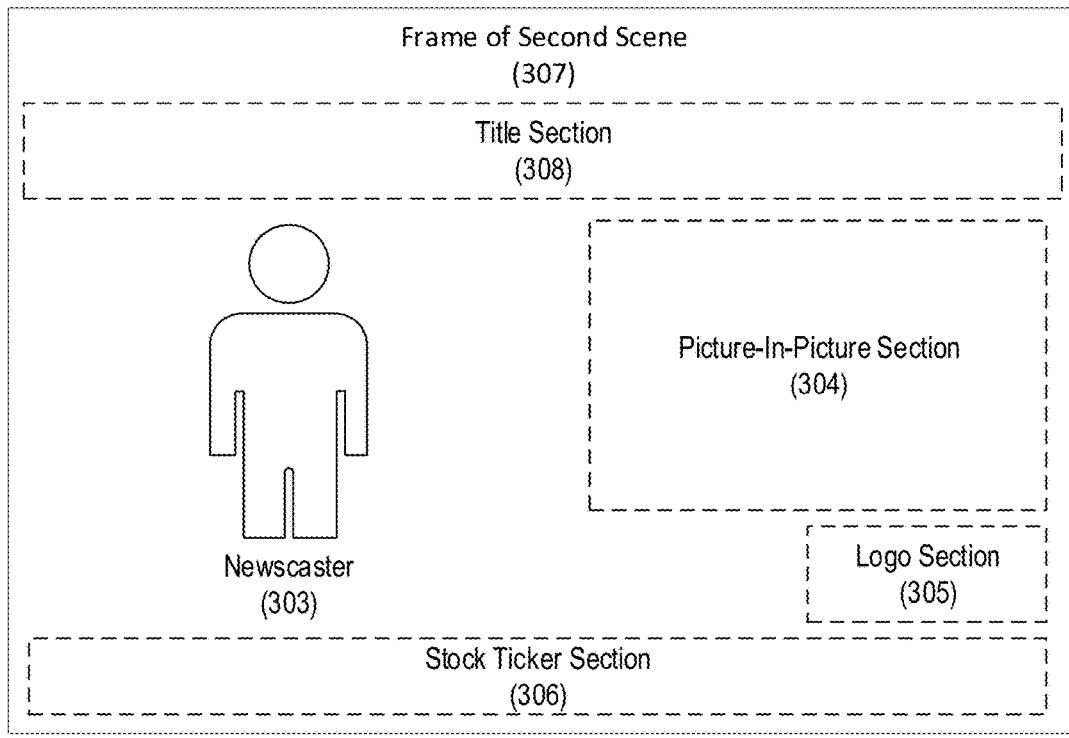
FIG. 3b shows an example frame of media content.

FIG. 3b shows an example of a frame from a scene. A frame 307 may be one of a plurality of frames, e.g., from the second scene 301b. The frame 307 depicts an example news report having visual elements including a title section 308, a newscaster 303, a picture-in-picture section 304, a logo section 305, and a stock ticker section 306. Each visual element may be any portion of one or more frames, and may correspond to one or more objects depicted in a scene (e.g., an actor, a scrolling news ticker, two actors embracing, or the like). For example, the news report may involve a parade, such that the title section 308 may display "Parade in Town," the picture-in-picture section 304 may display a video of the parade, the logo section 305 may display a logo of a network associated with the news report, the newscaster 303 may be speaking about the parade, and the stock ticker section 306 may display scrolling information about stock prices. Visual elements, such as the logo section 305, may be entirely independent from other visual elements, such as the newscaster 303. For example, the newscaster 303 may move in a region of the second scene 301b occupied by the logo section 305, but the logo section 305 may still be displayed (e.g., such that the newscaster 303 appears to be behind the logo section 305). Though the visual elements depicted in FIG. 3b are on a single frames, visual elements may persist throughout multiple frames of a scene, move throughout different frames of a scene, or otherwise may change across frames of a scene. For example, two different scenes may depict the same actor from different angles.

The visual elements shown in the frame 307 may exhibit different video properties and may be associated with different audio properties. The title section 308 and logo section 305, for example, may be relatively static over time (e.g., such that the title section 308 and the logo section 305 do not move across multiple frames and thus appear to be in substantially the same place over a period of time). The picture-in-picture section 304 and the stock ticker section 306, for example, may be relatively dynamic. Whereas the picture-in-picture section 304 may display video with unpredictable motion at a relatively low level of fidelity (e.g., at a low resolution such that content in the picture-in-picture section 304 may be relatively difficult to discern), the stock ticker section 306 may involve relatively predictable motion (e.g., scrolling) that requires a relatively high level of fidelity (e.g., so that smaller numbers may be readily seen). The newscaster 303 may be both relatively static (e.g., seated) but also exhibit a level of predictable motion (e.g., the newscaster 303 may speak and thereby move their mouth, head, and/or hands). While the newscaster 303 may be associated with audio (e.g., speech), the stock ticker section 306 need not be associated with audio. The newscaster 303 may be the source of audio (e.g., speech), whereas the stock ticker section 306 may be silent in that it is not associated with any audio. The background of the second scene 301b may be static or dynamic (e.g., a live feed of the outside of the news studio). Though different visual elements are shown in FIG. 3b, a scene may comprise only one piece of content (e.g., a static image taking up the entire frame).

Figure 3C:
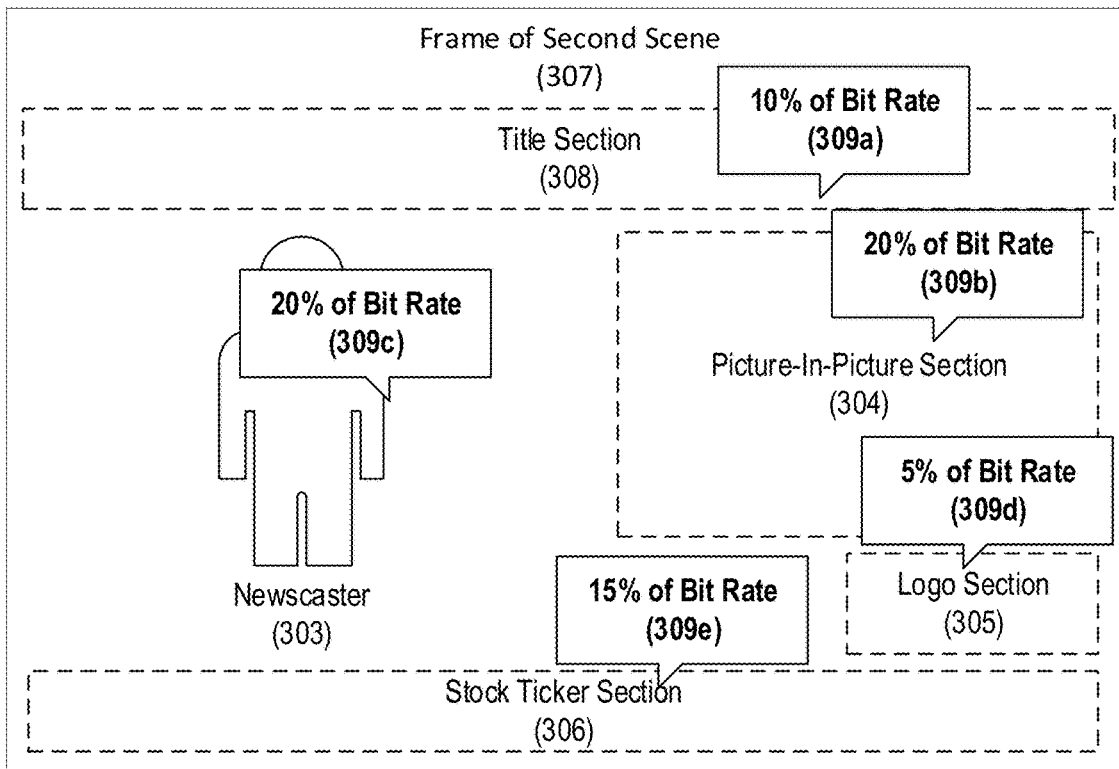
FIG. 3c shows encoder parameters assigned to visual elements in a frame.

FIG. 3c shows the same frame from FIG. 3b, but each visual element is assigned visual element encoder parameters 309a-309e. More particularly, FIG. 3c is a visual representation of how the visual element encoder parameters 309a-309e may be assigned to various visual elements. Such visual element encoder parameters 309a-309e may, for example, be stored in a database (e.g., a table correlating particular visual elements with particular visual element encoder parameters).

Different visual elements, such as those shown in the frame 307, may be encoded using different types of encoding parameters and/or different codes to prioritize different goals (e.g., perceived quality of a video, file size, transmission speed). For example, a relatively static visual element (e.g., the newscaster 303) may be best encoded using a better codec or higher encoder parameters as compared to a faster-moving visual element (e.g., the newscaster 303 walking across a stage). Visual fidelity need not be the only consideration with respect to the encoding of different visual elements. For example, for live content, the speed of encoding and/or decoding may be critical where real-time content is transmitted, and/or when one or more encoders must process a relatively large amount of data The visual element encoder parameters 309a-309e shown in FIG. 3c are relative to a maximum available bit budget, e.g., for the frame or for the scene. As will be described further below, though FIG. 3c shows bit rate as compared to a maximum available bit budget for simplicity, other visual element encoder parameters (e.g., resolution, color gamut, etc.) may be similarly distributed based on a maximum (e.g., a maximum resolution, a maximum color gamut, etc.). The title section 308 has visual element encoder parameters 309a providing for 10% of the available bit budget, the picture-in-picture section 304 has visual element encoder parameters 309b providing for 20% of the available bit budget, the newscaster 303 has visual element encoder parameters 309c providing for 20% of the available bit budget, the logo section 305 has visual element encoder parameters 309d providing for 5% of the available bit budget, and the stock ticker section 306 has visual element encoder parameters 309e providing for 15% of the available bit budget. For example, the visual element encoder parameters 309c (e.g., the bit rate) associated with the newscaster 303 may be higher (e.g., the bit rate may be greater) than the visual element encoder parameters 309d associated with the logo section 305 because encoding artifacts may be more easily visible on a static logo as compared to a moving human being. Visual elements may only be associated with a fraction of a maximum available bit budget, such that the remaining bit budget is distributed to the remainder of a frame. A scene which may be encoded without particular allocation to visual elements may, in contrast, have 100% of the maximum bit rate allocated across the scene, meaning that all visual elements share an average bit rate.

Figure 3D:
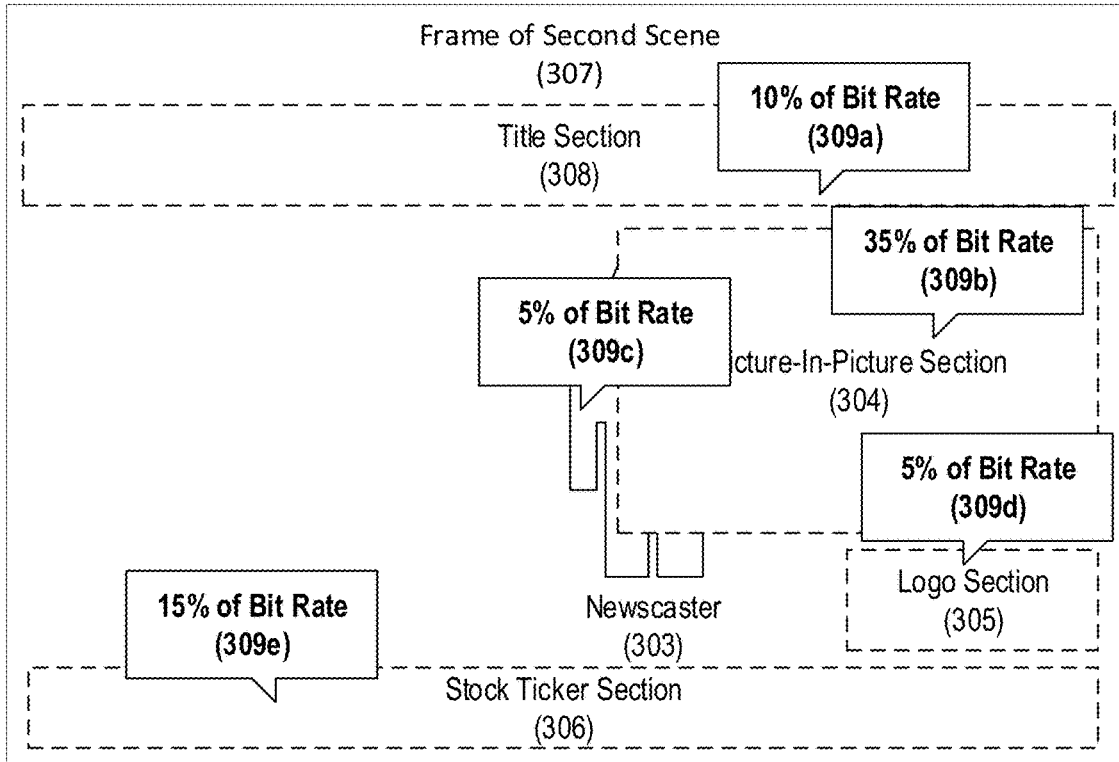
FIG. 3d shows encoder parameters assigned to rearranged visual elements in a frame.

FIG. 3d shows the same visual representation of visual element encoder parameters on a frame as FIG. 3c, but the newscaster 303 has moved to appear visually behind the picture-in-picture section 304. As with FIG. 3c, FIG. 3d is illustrative, and such visual element encoder parameters may be stored in, e.g., a database. As depicted in FIG. 3d, the visual element encoder parameters 309c associated with the newscaster 303 have lowered, and the visual element encoder parameters 309b associated with the picture-in-picture section 304 have increased. Specifically, the visual element encoder parameters 309c associated with the newscaster 303 are only 5% of the available bit rate, whereas the visual element encoder parameters 309b associated with the picture-in-picture section have raised to 35% of the available bit rate. Such a reallocation of bit rate may, for example, be because encoding artifacts may be less noticeable to the average viewer when the newscaster is partially hidden. A computing device (e.g., the computing device 200, the content server 106, the app server 107, and/or the encoding server 122) may be configured to detect a change in one or more visual elements (e.g., movement of the visual elements in the positions depicted in FIG. 3c to the positions depicted in FIG. 3d) and modify visual element encoder parameters to re-allocate visual element encoder parameters (e.g., a particular allocation of available bit rate to any given visual element) based on, for example, how much of the visual element is present in the frame.

Figure 3E:
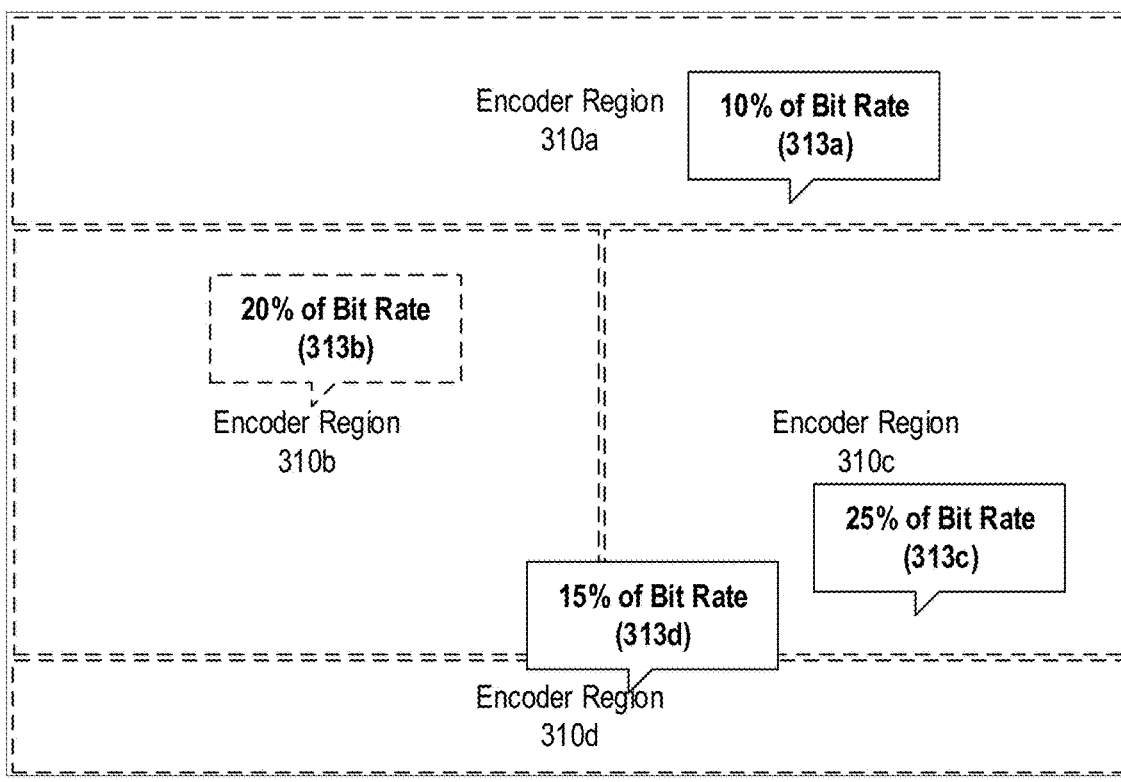
FIG. 3e shows encoding regions for a frame.

FIG. 3e shows an example of how a frame, such as the frame from FIG. 3c, may be divided into a plurality of encoder regions 310a-310e. FIG. 3b, FIG. 3c, and FIG. 3d depicted that visual elements may have complex contours and may move about a frame in a scene. Based on such visual elements, and to encode a frame, the frame may be divided into a plurality of encoder regions, wherein each encoder region may correspond to one or more visual elements. An encoder region may correspond to a portion of a frame (e.g., the top-left quarter of a frame), and the encoder region may inherit all or portions of visual element encoder parameters that are encapsulated the portion of the frame to which the encoder region corresponds. Each encoder region 310a-310e may be a particular region of pixels and/or a macroblock. Each encoder region may be the sum or average of multiple visual element encoder parameters for multiple visual elements within each region. As with FIG. 3d, for simplicity, FIG. 3e shows a distribution of bit rate as compared to a maximum bit budget. For example, encoder region 310a is associated with encoder region parameters 313a of 10% of the bit rate, encoder region 310b is associated with encoder region parameters 313b of 20% of the bit rate, encoder region 310c is associated with encoder region parameters 313c of 25% of the bit rate (e.g., the sum of visual element encoder parameters 309b and visual element encoder parameters 309d), and encoder region 310d is associated with encoder region parameters 313d of 15% of the bit rate. As an alternative example, the encoder regions depicted in FIG. 3e could correspond to resolution, such that the encoder region 310a could receive 15% of available pixels, the encoder region 310b could receive 25% of the available pixels, the encoder region 310c could receive 35% of the available pixels, and the encoder region 310d could receive 25% of the available pixels.

Figure 3F:
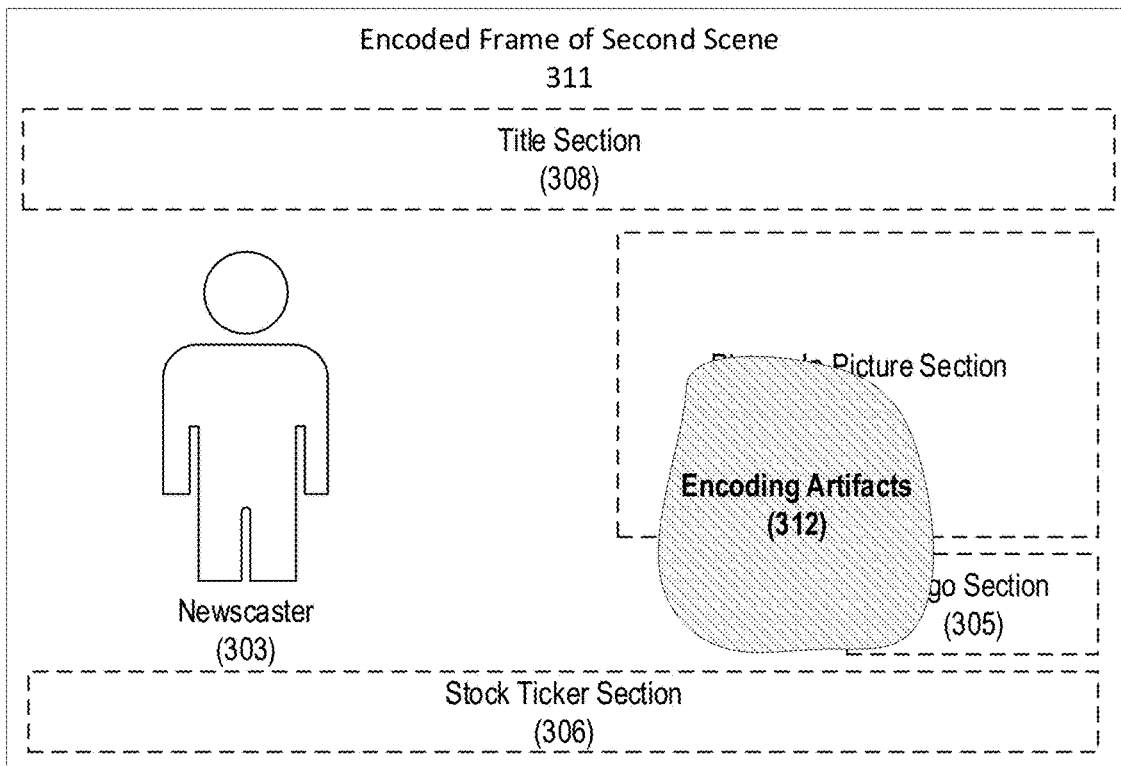
FIG. 3f shows an encoded frame with encoding artifacts.

FIG. 3f shows an encoded frame 311, of the second scene, which may have been generated by an encoder based on the encoder parameters associated with the encoder regions 310a-310d in FIG. 3c. Encoding artifacts 312 may be present in the encoded frame 311. The encoding artifacts 312 may be introduced because, for example, the encoding parameters associated with the encoder region 310c are insufficient given the level of detail and/or motion in that particular frame. As will be described in more detail below, if encoding artifacts 312 are unacceptable, the scene may be re-encoded.

Figure 4:
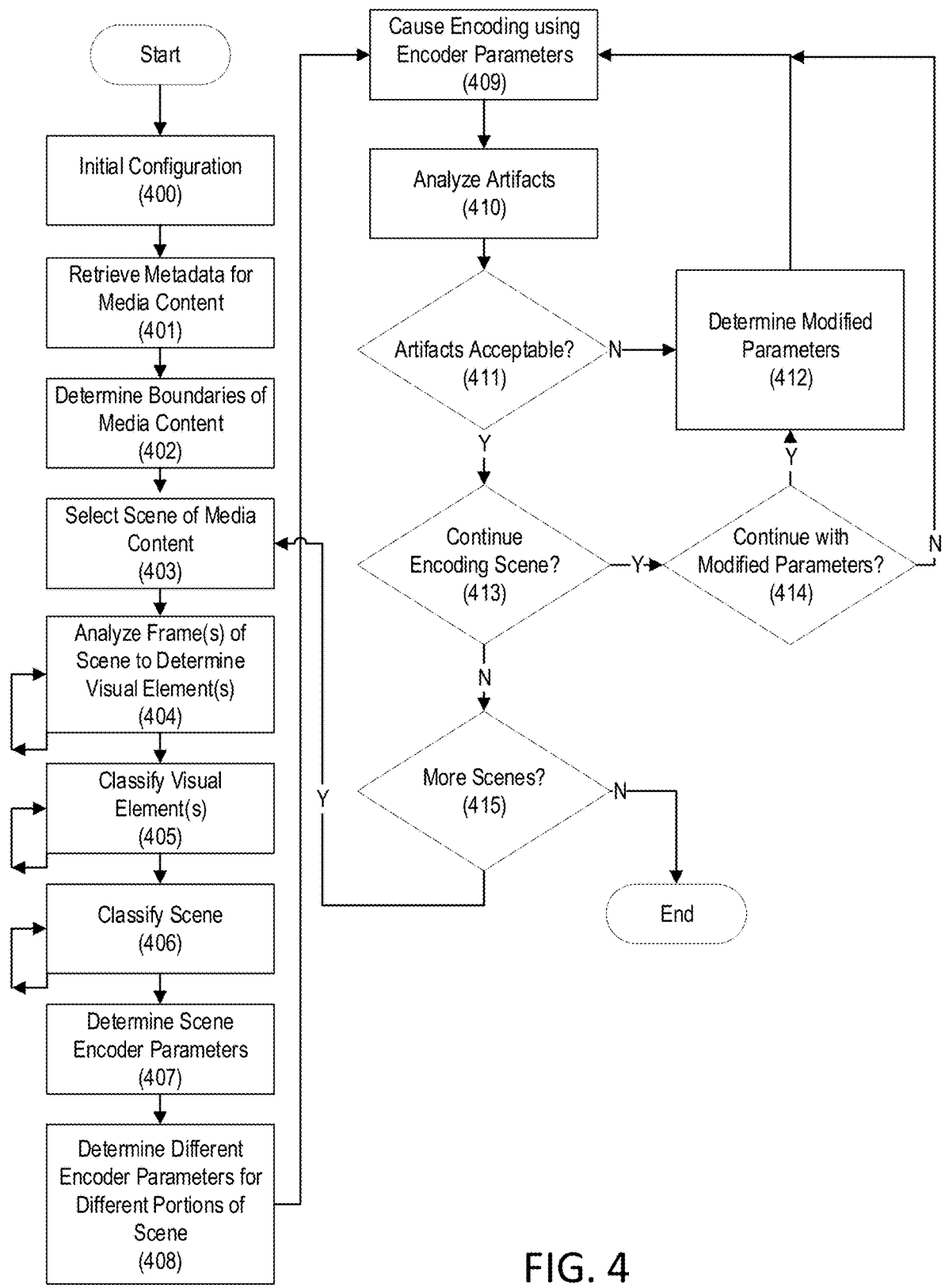
FIG. 4 is a flow chart showing an example method for scene classification and encoding.

FIG. 4 is a flow chart that is an example of an algorithm that may be performed to encode media content (e.g., the media content 300) with visual element-specific encoding parameters. The algorithm depicted in FIG. 4 may be performed by one or more computing devices, such as encoding server 122. In step 400, an initial configuration may be determined. A number of encoders available to encode scenes and which encoding parameters may be used by specific encoders may be determined. Target resolutions and/or bit rates for subsequent transmission of scenes may be determined. For example, the computing device may determine that each scene should be encoded three times: at 1000 kbps, 2500 kbps, and at 5000 kbps. An acceptable threshold level of artifacts may be determined. For example, the computing device may determine that a relatively low quantity of artifacts are acceptable for a 5000 kbps encode of a scene, but that a relatively high quantity of artifacts are acceptable for a 1000 kbps encode of the same scene. Artifact tolerances may be determined. For example, only a predetermined quantity of banding, blocking, blurring, or other artifacts may be determined to be permissible. The artifact tolerances may be determined based on a mean opinion score (MOS).

One or more rules for encoding may be determined. For example, only one encoder (e.g., ISO/IEC 14496-10, Advanced Video Coding, (a/k/a ITU-T H.264)) may be available, such that encoder parameters are determined based on parameters accepted by the H.264 encoder. A minimum encoder parameter setting may be established, such that a minimum level of quality is maintained across different scenes.

In step 401, the computing device may receive metadata associated with the media content 300. As part of step 401, the media content 300 and/or the metadata may be received, e.g., from the content server 106. The metadata may provide information about the media content 300 such as, for example, the genre of the media content 300, scene boundaries of the media content 300 (e.g., timestamps of the first frames of new scenes of the media content 300), the size and/or complexity of the media content 300, or other information regarding the media content 300.

In step 402, the computing device may determine one or more scene boundaries of the media content 300. The computing device may receive indications of scene boundaries (e.g., via the metadata received in step 401) and/or may analyze the media content 300 (e.g., using machine learning and/or one or more graphics processing algorithms) to determine scene boundaries of the media content 300. The one or more boundaries may be based on, for example, frame or region histograms, motion estimation, edge detection, and/or machine learning techniques. For example, a scene boundary may be determined between a first scene and a second scene based on a degree of visual change between two or more frames of the media content 300 satisfying a predetermined threshold. For example, the computing device may associate each I frame in a GOP to correspond to the beginning of a new scene, indicating the presence of a boundary.

One or more rules may be established, e.g., in step 400, to govern how the computing device may determine scene boundaries. For example, because scenes of the media content 300 are likely to last long enough to be perceived by a viewer, scene boundaries may be at least one second away from other scene boundaries. Scene boundaries may always exist at the beginning and end of the media content 300. Additionally or alternatively, media content 300 may include or be associated with data (e.g., the metadata received in step 400) indicating scene boundaries of one or more scenes. For example, a media content provider may provide, in metadata, a list of timecodes corresponding to scene boundaries in the media content 300.

In step 403, based on the locations of the scene boundaries in the media content, a scene of the media content 300 may be selected for encoding. The scene may be the portion of video and/or audio between two or more scene boundaries (e.g., the beginning of the media content and a boundary ten seconds after the beginning of the media content). The computing device may, for each boundary determined in the preceding step, determine a time code corresponding to the boundary and determine that periods of time between these time codes comprise scenes, and select a scene corresponding to one of those periods of time. For instance, if a first boundary is determined at 0:10, and a second boundary is determined at 0:30, then the computing device may select a scene that exists from 0:10-0:30. Additionally or alternatively, the scene may be identified based on the metadata received in step 400. For example, the metadata received in step 400 may indicate two time codes in the media content between which a scene exists.

In step 404, one or more frames of the scene may be retrieved and analyzed to identify visual elements (e.g., objects and/or scene boundaries between objects, groups of similarly-colored or textured pixels), motion of visual elements (e.g., that a group of pixels across multiple frames are moving in a certain direction together), or the like. For example, a portion of the scene which does not move and remains substantially the same color throughout the scene (e.g., a background) may be classified as a first visual element. A series of pixels in a frame which appear to move in conjunction (e.g., a newscaster) may be classified as a second visual element. A pattern or contiguous quantity of pixels may be determined and classified as a third visual element. The particular visual elements need not be perfectly identified: for example, a long but short rectangular grouping of pixels may be classified as a visual element before it is determined to correspond to a stock ticker. As such, visual elements may also be identified based on a plurality of pixels having the same or similar color and/or the same or similar direction of motion. As step 404 may involve analysis of one or more frames of the scene, step 404 may comprise rendering all or portions of the scene.

Identification of visual elements may be performed using an algorithm that comprises a machine learning algorithm, such as a neural network configured to analyze frames and determine one or more visual elements in the frames by comparing all or portions of the frames to known objects. For example, an artificial neural network may be trained using videos of news reports that have been pre-tagged to identify newscasters, stock tickers, logos, and the like. The artificial neural network may thereby learn which portions of any given frame(s) may correspond to visual elements, such as the newscaster. The artificial neural network may then be provided untagged video of news reports, such that the artificial neural network may determine which portions of one or more frames of the untagged video correspond to a newscaster.

Visual elements may be determined based on information specifically identifying the visual elements as contained in the metadata received in step 401. The metadata may specifically indicate which portions of a scene (e.g., which groups of pixels in any given frame) correspond to a visual element. For example, metadata may indicate that a particular square of pixels of a news report (e.g., a bottom portion of multiple frames) is a news ticker. Additionally or alternatively, the metadata may contain characterizations of a scene, which may be used by the computing device to make determinations regarding which types of visual elements are likely to be present in a scene. For example, a scene of an automobile race is more likely to have fast-moving visual elements, whereas a scene of a dramatic movie is less likely to have fast-moving visual elements. For example, a scene of a news report is likely to have a number of visual elements (e.g., stock tickers, title areas, picture-in-picture sections) with very specific fixed geometries (e.g., rectangles).

Visual elements need not be any particular shape and need not be in any particular configuration. Though a frame may comprise a plurality of pixels arranged in a rectangular grid, a visual element may be circular or a similar shape not easily represented using squares. A visual element may be associated with a plurality of pixels in any arbitrary configuration, and the plurality may change or be modified across multiple frames of a scene. For example, the newscaster 303 may be human-shaped, and the encoder region 310b corresponding to the newscaster 303 may be a plurality of pixels that collectively form a multitude of adjacent rectangular shapes. A visual element may be larger or smaller than the particular visible boundaries of an object. For example, a visual element may comprise an area which a newscaster may move in a series of frames. Additionally or alternatively, visual elements may be aliased or otherwise fuzzy such that a visual element may comprise more pixels or content than the object to which the visual element corresponds (e.g., a number of pixels around the region determined to be a visual element).

Step 404 may be repeated, e.g., to classify all visual elements in a scene, to classify a predetermined number of visual elements in a scene, and/or to classify visual elements in a scene until a particular percentage of a frame is classified. For example, a computing device may be configured to assign at least 50% of a frame to one or more visual elements.

In step 405, one or more of the visual elements may be classified. Because different visual elements may have different visual properties (e.g., different visual elements may move differently, have a different level of fidelity, and/or may be uniquely vulnerable to encoding artifacts), classifications may be used to determine appropriate visual element encoder parameters for such properties. Classifying a visual element may comprise associating the visual element with descriptive information, such as a description of what the visual element is, how the visual element moves, visual properties (e.g., fidelity, complexity, color gamut) of the visual element, or similar information. For example, a computing device may store, in memory, an association between a particular visual element (e.g., the bottom fourth of a frame) with an identity (e.g., a news stock ticker). The descriptive information may be stored in a database, and the database may be queried in the process of classifying a visual element. For example, a computing device may query the database to determine the identity of an unknown visual element (e.g., a short, wide rectangle), and the database may return one or more possible identities of the visual element (e.g., a stock ticker, a picture-in-picture section). Queries to such a database may be based on color, size, shape, or other properties of an unknown visual element. A simplified example of how such a database may store classifications, in an extremely limited example where only width and height are considered and only four classifications are possible, is provided below as Table 1.

TABLE 1

| Width | Height | Classification |
|---|---|---|
| Wide | Short | Stock Ticker |
| Narrow | Short | Logo Section |
| Wide | Tall | Background |
| Narrow | Tall | Newscaster |

The computing device may use a machine learning algorithm, such as an artificial neural network, to classify the one or more visual elements by learning, over time, what certain objects (e.g., a human, a stock ticker) look like in different frames of different scenes. For example, an artificial neural network may be provided various images of various visual elements, such as a plurality of different images of a newscaster (e.g., up close, far away, sitting down). The artificial neural network may then be provided individual frames of a news report and prompted to identify the location, if applicable, of a newscaster. The artificial neural network may also be prompted to provide other characterizations of the newscaster, such as whether or not the newscaster is seated. This artificial neural network may be supervised or unsupervised, such that the machine learning algorithm may be provided feedback (e.g., from a second computing device) regarding whether it correctly identified the location and/or presence and/or position of the newscaster.

Visual element classifications need not relate to the identity of a visual element, but may correspond to visual properties (e.g., complexity, motion) of the visual element. Visual element classifications may be based on an area complexity (e.g., variance) at edges within an area of a frame, at detected artifacts, or the like. Visual element classifications may relate to whether a visual element is likely to move, such that a sleeping human being depicted in a scene may be classified as static, whereas a walking human being depicted in a scene may be classified as dynamic. Visual element classifications may indicate a level of detail of a visual element, e.g., such that grass may be more complex and evince compression artifacts more readily than a clear blue sky, though a cloudy sky may evince compression artifacts just as readily as grass. Visual element classifications may relate to film techniques, e.g., such that out-of-focus visual elements are classified differently than in-focus visual elements, and/or such that visual elements that undesirably shake are classified as having motion judder. Visual element classifications may relate to the origin or nature of a visual element, e.g., such that an animated character is classified differently than a real human being, or that an element of a movie is classified differently than an element of a television show. Visual element classifications may relate to the subjective importance of a visual element, e.g., such that a logo of a television station is considered less subjectively important to a viewer than a human face (or vice versa). A visual element need not be classified, or may be classified with one or more visual element classifications.

Visual element classifications may be based on information characterizing scenes as contained in metadata corresponding to media content, such as the metadata received in step 401. For example, if information in metadata suggests that the scene relates to a news show, the computing device may classify visual elements by searching for predetermined visual elements commonly shown in a news show (e.g., a newscaster such as the newscaster 303, a stock ticker section such as the stock ticker section 306, etc.). The computing device may use such information in the metadata as a starting point for classifying visual elements in a scene, but need not rely exclusively on the metadata. For example, the information in the metadata may indicate that a news report is unlikely to feature fast motion, but the computing device may, based on analyzing the scene, determine that fast motion is present (e.g., in the picture in picture section 304). The computing device may use machine learning to determine visual elements in a scene, and the machine learning may be configured to, over time, learn various properties of those visual elements in a scene (e.g., that newscasters in a news report are likely to move, but only in small amounts).

Visual element classifications may relate visual elements to other visual elements. As an example, the logo section 305 and the stock ticker section 306 may always appear together, though the two may exhibit different motion properties. The boundary of a first visual element may cross a boundary of another visual element, and both may be classified as touching or otherwise interacting visually.

Classifications of visual elements of a scene may be based in part on an estimate of the subjective importance of all or portions of a scene. Such subjective importance may correspond to the region of interest (ROI) of a scene. A viewer may be predicted to focus on a moving visual element more readily than a static visual element, an interesting visual element rather than an uninteresting visual element, a clear visual element more than a blurry visual element, and the like. Visual elements may correspondingly be classified in terms of their relative priority of a scene such that, for example, a lead actor may be classified with a high level of importance, whereas blurry background detail may be classified with a low level of importance.

Classifications of visual elements may indicate a degree of confidence. For example, a newscaster may be partially hidden in a scene (e.g., seated behind a desk) such that they may still appear to be a newscaster, but a classification that a group of pixels corresponds to a newscaster may be speculative. The computing device may be only moderately confident that a newscaster is in motion. Such degrees of confidence may be represented as, for example, a percentage value.

A classification that a visual element is in motion may indicate a speed of motion (e.g., that the visual element is moving quickly, as compared to slowly) and/or a direction of motion (e.g., that the visual element is moving to the left, to the right, and/or unpredictably). For example, a visual element with motion judder may be classified based on the nature of the motion judder (e.g., horizontal, vertical, and/or diagonal). A visual element classification may be based on predicted motion. A computing device may be configured to predict whether, based on the motion of the visual element across multiple frames, the visual element is likely to leave the frame during the scene. Such motion may be quantified by, for example, determining a number of pixels per frame that the visual element moves. As yet another example, a visual element classification may be applied to all visual elements in a scene to indicate that a camera is moving to the left in the scene, meaning that all visual elements are likely to appear to move to the right in one or more frames of the scene. Encoder parameters may be selected to use a higher quantizer on pixels associated with a moving area, and/or may be selected to bias towards true motion vectors as compared to other motion vectors.

In step 406, the scene may be classified. Determining classifications of an entire scene, as well as classifications of individual visual elements therein, may allow for more particularized encoder parameter decisions. For example, a news report may have periods of action and inaction (e.g., when a newscaster is talking versus when an on-the-scene report is shown), yet the same visual elements (e.g., a newscaster) may be present. As such, for example, a scene involving players not in motion may be classified as a time out scene. The scene classification may be based on the classification of the one or more visual elements. For example, a scene may be classified as a news report if visual elements comprising newscasters are determined to be present, whereas the same scene may be classified as a commercial after the news report if the visual elements no longer comprise a newscaster. Additionally or alternatively, scene classifications may relate to the importance of a scene, the overall level of motion in a scene, the level of detail in a scene, the film style of a scene, or other such classifications, including similar classifications as discussed above with regard to visual elements. For example, a scene comprising a plurality of visual elements determined to have high fidelity may itself be classified as a high quality scene, whereas a scene comprising a mixture of visual elements with high and low fidelity may be classified as a normal quality scene.

In step 407, based on the visual element classifications and/or the scene classification, scene encoder parameters may be determined. Such scene encoder parameters may be for the entirety of or a portion of (e.g., a particular time period of) a scene and may apply across multiple visual elements of the scene. The scene encoder parameters may be selected based on one or more of the scene classifications and/or one or more of the visual element classifications to, for example, optimize quality based on the content of the scene. For example, based on determining that a scene depicts a news report, scene encoder parameters prioritizing fidelity may be used. In contrast, based on determining that a scene depicts an exciting on-the-scene portion of the news report (e.g., a car chase), scene encoder parameters prioritizing motion may be used. An example of encoder parameters which may be determined based on simplified characteristics is provided below as Table 2. In Table 2, the fidelity and amount of motion may be either low or high, and the sole encoder parameter controlled is a quantization parameter (QP).

TABLE 2

| Visual Element Identity | Fidelity | Amount of Motion | QP |
| --- | --- | --- | --- |
| Title Section | Low | Low | Medium |
| Picture-In-Picture Section | Low | High | Small |
| Logo | High | Low | Large |
| Newscaster | High | High | Small |

Encoder parameters, such as the scene encoder parameters in step 407 and the visual element encoder parameters discussed below with reference to step 408, may be any data, settings, or other information used by an encoder to encode the scene. Bit rate, coding tree unit (CTU) size and structure, quantization related settings, the size of search areas in motion estimation, and QP, are all examples of encoder parameters. Encoder parameters may be selected and/or determined based on available encoders and/or codecs for a scene. For example, the encoder parameters used for H.264 or MPEG-4 Part 10, Advanced Video Coding content may be different than the encoder parameters used for the AV1 video coding format developed by Alliance for Open Media.

In step 408, based on the visual element classifications and/or the scene classification, different visual element encoder parameters for different portions of the scene corresponding to different visual elements may be determined. Visual elements in a frame and/or scene need not be associated with the same visual element encoder parameters; rather, visual elements may be associated with different visual element encoder parameters. Different visual elements in the same scene may be associated with different encoder parameters. For example, as shown in FIG. 3c, the newscaster 303 is associated with visual element encoder parameters 309c (e.g., 20% of the available bit rate), whereas the stock ticker section 306 is associated with visual element encoder parameters 309e (e.g., 15% of the available bit rate). The computing device may, for example, select a high QP for a race car, but a low QP for a logo.

Multiple encoder settings may be available: a high bit rate, high fidelity setting allocating a relatively low bit rate for motion (e.g., low CTU sizes, high bit rate allocation for detail, low bit rate allocation for motion vectors), a high bit rate, low fidelity setting allocating a relatively high bit rate for motion (e.g., large CTU sizes, low bit rate allocation for detail, high bit rate allocation for motion vectors), and a default setting (e.g., moderate CTU sizes, moderate bit rate allocation for detail, moderate bit rate allocation for motion vectors). In the context of rate-distortion optimization, the equation $J=D+\lambda R$ may be used, where D is distortion (e.g., fidelity), R is rate (e.g., the cost of encoding a motion vector), and $\lambda$ may be modified. In an example news report, portions of frames of a scene relating to visual elements comprising a picture-in-picture section may be associated with encoder parameters prioritizing motion, as the visual element of picture-in-picture sections (e.g., as stored in a database) may be associated with a category of visual elements likely to move. Different portions of frames of the same scene relating to visual elements comprising static elements, such as a visual element depicting a score, may be associated with the setting prioritizing fidelity, particularly since it may be frequently looked at by viewers and because it is not expected to move in the frame. And, remaining portions of the portions of the frames of the scene may be associated with the default setting. In this manner, portions of the same scene and the same frames may be encoded differently, and using different encoder parameters.

The visual element encoder parameters may be relative to the scene encoder parameters such that, for example, visual element encoder parameters may be a percentage of maximum encoder parameters as defined by the scene encoder parameters. For example, as shown in FIG. 3c, one visual element (e.g., the title section 308) may be associated with 10% of the maximum bit rate of a scene, whereas another visual element (e.g., the newscaster 303) may be associated with 20% of the maximum bit rate of the scene.

The classifications assigned to a visual element or scene may include an indication of which encoder parameters may be more important than others. For example, a classification corresponding to a human face may be associated with encoder parameters corresponding to higher image fidelity (e.g., smaller QP) as compared to a classification corresponding to a fast-moving, low detail picture-in-picture section (which may, e.g., be associated with relatively larger QP). A classification for a visual element may suggest that, because the visual element is unlikely to move, one type of encoding parameter be prioritized over another. A combination of visual element classifications may indicate that a certain portion of a scene (e.g., the top half of one or more frames) should be provided better encoding parameters (e.g., a smaller QP) than another portion of the scene.

Though determination of the scene encoder parameters and the visual element encoder parameters are depicted separately in steps 407 and 408, the encoder parameters may be determined simultaneously, or the visual element encoder parameters may be determined before the scene encoder parameters. For example, visual element encoder parameters (e.g., bit rate for a plurality of visual elements) may be determined, and then, based on an arithmetic sum of those encoder parameters (e.g., an arithmetic sum of all bit rates), scene encoder parameters may be determined (e.g., a bit rate for the scene).

The visual element encoder parameters and scene encoder parameters may be processed for use by an encoder. The visual element encoder parameters may be combined to form combined visual element encoder parameters. For example, an encoder may require that bit rates be provided in specific increments (e.g., multiples of 10), such that a determined bit rate may be rounded to the nearest increment. The visual element encoder parameters and scene encoder parameters may be used to determine a grid of a plurality of rectangular portions of the scene (e.g., macroblocks based on the smallest partition of one or more frames provided by a particular codec and/or video compression standard). Such rectangular portions may be the same or similar as the encoder regions depicted in FIG. 3e. Visual element encoder parameters may be combined and modified to fit these rectangular portions (e.g., such that macroblock encoder parameters are determined based on the location of various macroblocks as compared to visual element encoder parameters). For example, the grid may be determined based on the location and shape of each of a plurality of visual elements, the visual element encoder parameters of each of the plurality of visual elements, and the scene encoder parameters. For each such rectangular portion, the computing device may determine particular encoder parameters, such as the relative priority of the rectangle for bit budget distribution, the importance of high frequencies and motion fidelity (e.g., whether jitter is permissible in movement of a visual across multiple frames), and/or similar encoder parameters.

The rectangular portions (e.g., the macroblocks and/or encoder regions depicted in FIG. 3e) may be dynamically reconfigured based on, for example, motion in the scene (e.g., across a plurality of frames of the scene). For example, a visual element may move across multiple frames in a manner that means that the visual element may be in a different portion of each frame of the multiple frames. Such motion may be determined by analyzing multiple frames in a scene and determining differences, if any, between the locations of a visual element (e.g., the particular group of pixels associated with a visual element) across the multiple frames. Based on such motion, rectangular portions (e.g., on a frame-by-frame and/or macroblock-by-macroblock basis) of a frame may be reconfigured to account for such motion. For example, if a visual element corresponding to an object passes into a region formerly occupied by large block sizes (e.g., large CTU sizes), the computing device may be configured to cause the blocks to become smaller to account for the border of the object. Where a visual element leaves a region formerly using very small block sizes (e.g., small CTU sizes), the computing device may be configured to cause the blocks to become larger by modifying encoding parameters (e.g., by modifying the CTU size parameter for an encoding device such that the formerly small region is enlarged).

The scene encoding parameters and/or visual element encoding parameters may be determined based on previous encoding parameters, e.g., as used previously to encode the same or different scenes. Metadata corresponding to previous encoding processes of the same or a different scene may be used to determine subsequent scene encoding parameters and/or visual element encoding parameters. Encoders may be configured to store, e.g., as metadata, information corresponding to the encoding of media content, and such information may be retrieved in subsequent encoding processes. An encoder may be configured to generate, after encoding media content, metadata corresponding to artifacts in the encoded media content. Perceptual metrics algorithms that may be used to determine such artifacts may include the Video Multi-Method Assessment Fusion (VMAF), Structural Similarity (SSIM), Human Visual System (HVS) Peak Signal-to-Noise Ratio (PSNR), and/or DeltaE2000 algorithms. Based on metadata corresponding to previous encoding processes, scene encoding parameters and/or visual element encoding parameters may be selected to avoid such artifacts. The encoders may also be configured to store, in metadata, information about previous visual element classifications, scene encoder parameters, and/or visual element encoder parameters. For example, metadata may indicate that, for a news report, three visual elements (e.g., a newscaster, a picture-in-picture section, and a background) were identified, and the metadata may further indicate which encoding settings were associated with each respective visual element of the three visual elements. The metadata need not be for the same media content. For example, visual element classifications of the same scene at a higher resolution are likely to be equally applicable at a lower resolution. Certain visual elements from previous scenes may be predicted to re-appear in subsequent scenes based on, for example, the genre of media content being encoded. Encoder parameters used to produce a good quality version of a previous scene may be used as a starting point to determine encoder parameters for a subsequent scene.

The visual element encoder parameters and/or the scene encoder parameters may comprise motion estimation and mode information and/or parameters. In the process of encoding media content (e.g., the media content 300), a computing device may determine one or more motion vectors. A motion vector decision may be made using the equation D+λR, where D represents distortion (e.g., the difference between a source and predicted picture), R represents the rate (e.g., the cost of encoding a motion vector), and λ is an encoder parameter determining the relative priority of D and R. The visual element encoder parameters and scene encoder parameters may, for example, comprise a value of λ or be configured to influence the weighting of λ. For example, a scene involving continually panning across a grass field may suggest a continual rate of motion across fine detail content, which may indicate that the encoding parameters should be allocated towards the grass rather than the motion.

In step 409, the scene may be encoded using the encoding parameters determined in steps 407 and/or 408. A computing device may itself perform the encoding steps, or may cause one or more encoding devices (e.g., encoding devices communicatively coupled to the computing device) to do so. Causing encoding of the scene may comprise formatting and/or transmitting the encoding parameters for use. For example, an encoding device may require encoding parameters in a particular format, and the computing device may be configured to modify the encoding parameters to comport with the particular format. The particular compression standard used may be, for example, High Efficiency Video Coding (HEVC), Advanced Video Coding (AVC) and/or H.264, MPEG-2 and/or H.262, and/or MPEG-4 Part 2 (ISO/IEC 14496-2).

In step 410, one or more artifacts of the scene encoded in step 408 may be analyzed. Such artifacts may be, for example, motion judder, color bleeding, banding, blocking, and/or loss of texture. Such an analysis may include using objective perceptual metrics (e.g., VMAF, visual information fidelity in pixel domain (VIFp), SSIM, and/or PSNR).

In step 411, the computing device may determine whether the artifacts analyzed in step 410 are acceptable. Determining whether the artifacts are acceptable may comprise, for example, determining that the quantity and/or severity of the artifacts would be noticeable to a viewer. Whether or not artifacts are visible to a viewer may be based on analysis using perceptual metrics. The computing device may accept artifacts that are, based on perceptual metrics, within a predetermined threshold and thus acceptable, but may be configured to reject artifacts that would be readily noticed by the typical viewer of the same scene. Determining whether the artifacts are acceptable may comprise comparing a quantity and/or quality of the artifacts to a threshold. Such a threshold may be determined, e.g., in step 400, based on, for example, the genre of the media content as determined from the metadata, and/or based on what perceptual quality metrics indicate about the scene. For example, television shows may have a more permissive PSNR threshold than movies, as viewers may more readily tolerate compression artifacts in television shows than in movies. If the artifacts are acceptable, the flow chart proceeds to step 413. Otherwise, the flow chart proceeds to step 412.

In step 412, the computing device may determine modified encoder parameters for the scene. The modified encoder parameters may be based on the artifacts analyzed in step 410. If perceptual metrics indicate that the motion quality of an encoded scene is poor, then the modified encoder parameters may be based on allocating additional bit rate to motion data. If the perceptual metrics indicate that visual elements classified as having high fidelity (e.g., a high level of visual detail, a defined pattern) are of poor quality, the modified encoder parameters may be based on allocating additional bit rate to the visual elements.

The modified parameters for the scene may comprise modifying the visual element encoder parameters associated with one or more visual elements. For example, the visual element encoder parameters for a grassy field in a scene may have been too low, causing the grass to appear blurry and lack texture detail. The modified parameters may, for example and relative to the encoder parameters determined in step 408, lower the bit rate associated with the sky in the scene a first quantity and raise the bit rate associated with the grass in the scene by the first quantity.

In step 413, it is determined whether to continue encoding the scene. A scene may be encoded multiple times, e.g., at different resolutions or at different bit rates, as determined in step 400. If the scene should be encoded again, the flow chart may proceed to step 414. Otherwise, the flow chart may proceed to step 415.

In step 414, it is determined whether to continue with modified parameters. When determining different encoder parameters (e.g., in step 408), a plurality of different encoder parameters for a scene (e.g., a plurality of different encoder parameters for encoding at different resolutions) may be determined, such that the scene may be encoded multiple times (e.g., at different resolutions) without continuing with modified parameters. Continuing with modified encoder parameters (e.g., for a different resolution, for a different bit rate, or the like) may be desirable where initial parameters (e.g., for a first resolution) are determined, but where subsequent parameters (e.g., for a second, different resolution) are not yet determined. If it is determined to continue with modified parameters, the flow chart may proceed to step 412. Otherwise, the flow chart may return to step 409.

In step 415, the computing device may determine whether additional scenes exist. For example, the computing device may be configured to iterate through a plurality of scenes. If another scene exists for encoding, the flow chart returns to step 402 and selects the scene. Otherwise, the flow chart ends.

Although examples are described above, features and/or steps of those examples may be combined, divided, omitted, rearranged, revised, and/or augmented in any desired manner. Various alterations, modifications, and improvements may be made. Such alterations, modifications, and improvements are intended to be part of this description, though not expressly stated herein, and are intended to be within the spirit and scope of the disclosure. Accordingly, the foregoing description is by way of example only, and is not limiting.

The invention claimed is:

1. A method comprising:
receiving, by a computing device, a content item and information indicating a plurality of visual elements in the content item;
allocating, to a plurality of regions of the content item and based on the plurality of visual elements in the content item, different encoding parameters;
determining that a first visual element of the plurality of visual elements moves from a first region of the plurality of regions to a second region of the plurality of regions based on one or more of:
an indication that motion, associated with the first visual element, is expected to be predictable; or
a speed of motion associated with the first visual element, wherein the second region is occupied by a second visual element of the plurality of visual elements;
adjusting, based on an amount of the first visual element that is visible in the second region, encoder parameters corresponding to the second region; and
causing the second region to be encoded using the adjusted encoder parameters.

2. The method of claim 1, wherein the determining that the first visual element of the plurality of visual elements moves from the first region of the plurality of regions to the second region of the plurality of regions comprises:
based on determining that the first visual element is associated with a human being, determining a likelihood of movement associated with the human being; and
selecting, based on the likelihood of movement associated with the human being, first encoder parameters.

3. The method of claim 1, further comprising:
identifying, in the content item and based on information indicating motion characteristics for one or more of the plurality of visual elements, a first visual element, of the plurality of visual elements, as scrolling text.

4. The method of claim 1, further comprising:
determining, based on the plurality of visual elements, a type of scene, wherein the allocating the different encoding parameters comprises allocating, based on the type of scene, different portions of a maximum encoding bitrate to each of the plurality of regions of the content item.

5. The method of claim 1, further comprising:
based on determining that a third visual element of the plurality of visual elements is expected to be static in a third region of the plurality of regions for a period of time, selecting second encoder parameters for the third region, wherein the second encoder parameters are different from the adjusted encoder parameters.

6. The method of claim 1, wherein the adjusting the encoder parameters corresponding to the second region is based on determining that motion of the first visual element is unpredictable, and wherein the adjusted encoder parameters correspond to lower image fidelity.

7. A computing device comprising:
one or more processors; and
memory storing instructions that, when executed by the one or more processors, cause the computing device to:
receive a content item and information indicating a plurality of visual elements in the content item;
allocate, to a plurality of regions of the content item and based on the plurality of visual elements in the content item, different encoding parameters;
determine that a first visual element of the plurality of visual elements moves from a first region of the plurality of regions to a second region of the plurality of regions based on one or more of:
an indication that motion, associated with the first visual element, is expected to be predictable; or
a speed of motion associated with the first visual element, wherein the second region is occupied by a second visual element of the plurality of visual elements;
adjust, based on an amount of the first visual element that is visible in the second region, encoder parameters corresponding to the second region; and
cause the second region to be encoded using the adjusted encoder parameters.

8. The computing device of claim 7, wherein the instructions, when executed by the one or more processors, cause the computing device to determine that the first visual element of the plurality of visual elements moves from the first region of the plurality of regions to the second region of the plurality of regions by causing the computing device to:
based on determining that the first visual element is associated with a human being, determine a likelihood of movement associated with the human being; and
select, based on the likelihood of movement associated with the human being, first encoder parameters.

9. The computing device of claim 7, wherein the instructions, when executed by the one or more processors, cause the computing device to:
identify, in the content item and based on information indicating motion characteristics for one or more of the plurality of visual elements, a first visual element, of the plurality of visual elements, as scrolling text.

10. The computing device of claim 7, wherein the instructions, when executed by the one or more processors, cause the computing device to:
determine, based on the plurality of visual elements, a type of scene, wherein the instructions, when executed by the one or more processors, cause the computing device to allocate the different encoding parameters by causing the computing device to allocate, based on the type of scene, different portions of a maximum encoding bitrate to each of the plurality of regions of the content item.

11. The computing device of claim 7, wherein the instructions, when executed by the one or more processors, cause the computing device to:
based on determining that a third visual element of the plurality of visual elements is expected to be static in a third region of the plurality of regions for a period of time, select second encoder parameters for the third region, wherein the second encoder parameters are different from the adjusted encoder parameters.

12. The computing device of claim 7, wherein the instructions, when executed by the one or more processors, cause the computing device to adjust the encoder parameters corresponding to the second region based on determining that motion of the first visual element is unpredictable, and wherein the adjusted encoder parameters correspond to lower image fidelity.

13. One or more non-transitory computer-readable media storing instructions that, when executed, cause:
   receiving, by a computing device, a content item and information indicating a plurality of visual elements in the content item;
   allocating, to a plurality of regions of the content item and based on the plurality of visual elements in the content item, different encoding parameters;
   determining that a first visual element of the plurality of visual elements moves from a first region of the plurality of regions to a second region of the plurality of regions based on one or more of:
      an indication that motion, associated with the first visual element, is expected to be predictable; or
      a speed of motion associated with the first visual element, wherein the second region is occupied by a second visual element of the plurality of visual elements;
   adjusting, based on an amount of the first visual element that is visible in the second region, encoder parameters corresponding to the second region; and
   causing the second region to be encoded using the adjusted encoder parameters.

14. The one or more non-transitory computer-readable media of claim 13, wherein the instructions, when executed, cause the determining that the first visual element of the plurality of visual elements moves from the first region of the plurality of regions to the second region of the plurality of regions by causing:
   based on determining that the first visual element is associated with a human being, determining a likelihood of movement associated with the human being; and
   selecting, based on the likelihood of movement associated with the human being, first encoder parameters.

15. The one or more non-transitory computer-readable media of claim 13, wherein the instructions, when executed, cause:
   identifying, in the content item and based on information indicating motion characteristics for one or more of the plurality of visual elements, a first visual element, of the plurality of visual elements, as scrolling text.

16. The one or more non-transitory computer-readable media of claim 13, wherein the instructions, when executed, cause:
   determining, based on the plurality of visual elements, a type of scene, wherein the allocating the different encoding parameters comprises allocating, based on the type of scene, different portions of a maximum encoding bitrate to each of the plurality of regions of the content item.

17. The one or more non-transitory computer-readable media of claim 13, wherein the instructions, when executed, cause:
   based on determining that a third visual element of the plurality of visual elements is expected to be static in a third region of the plurality of regions for a period of time, selecting second encoder parameters for the third region, wherein the second encoder parameters are different from the adjusted encoder parameters.

* * * * *